July 4, 1944.  R. W. LOEBE  2,352,844
CAMERA ATTACHMENT
Filed Jan. 17, 1942
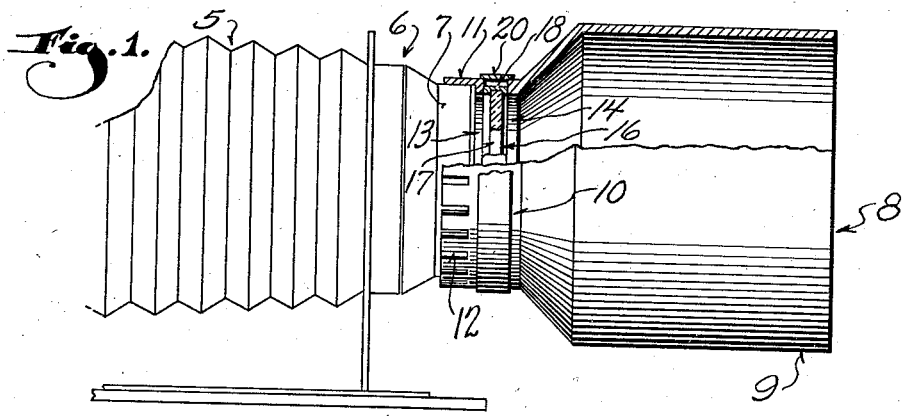
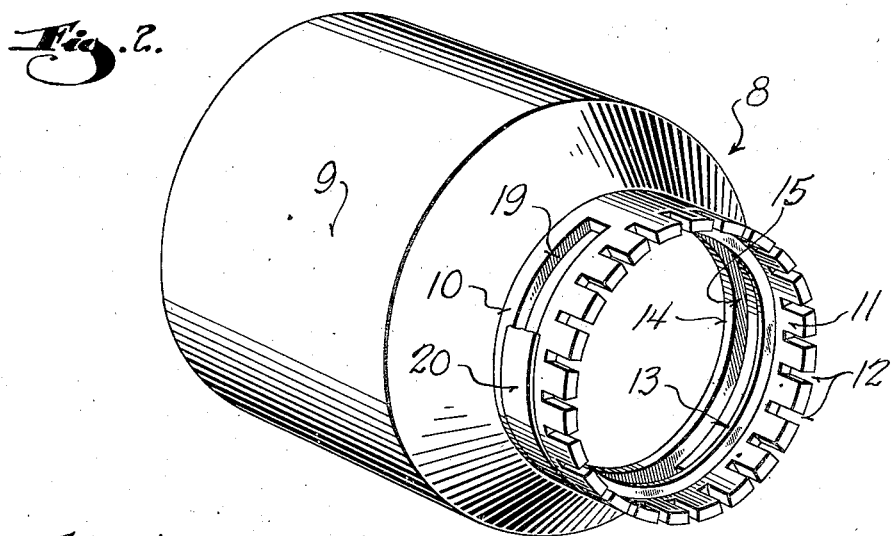
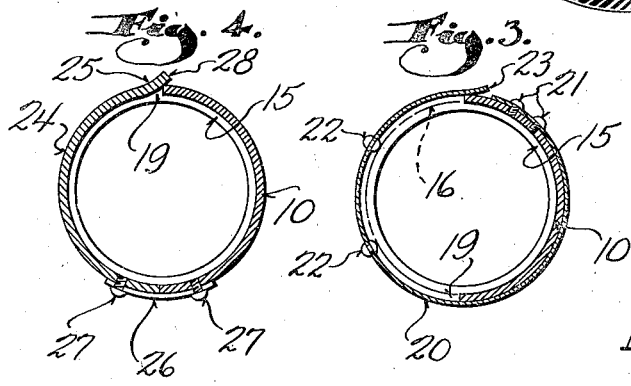
Inventor
Robert W. Loebe Patented July 4, 1944

2,352,844

UNITED STATES PATENT OFFICE 2,352,844

CAMERA ATTACHMENT

Robert W. Loebe, Wauwatosa, Wis.

Application January 17, 1942, Serial No. 427,133

2 Claims. (Cl. 88—1)

This invention relates to photographic equipment and refers more particularly to improvements in sunshade and filter attachments for cameras.

As is well known, the most widely used of the present-day cameras are those of the bellows type which have a protruding lens housing at the forward end of the bellows. In the interests of good photography, it is frequently necessary to secure a sunshade over the lens housing of the camera, particularly when the subject to be photographed is in line or nearly so with a source of light. Under such conditions, the camera lens must be shielded to preclude improper exposure of the film.

Substantially all the commercially available types of sunshades used for this purpose at present consist merely of a tubular attachment, one end of which slips on over the protruding end of the lens housing of the camera.

The same portion of the lens housing also serves as a support in mounting filters on the camera such as are employed in photographing certain scenery. When the use of a filter is required, it is the practice at present to employ a holder or adapter for the filter which has a tubular part applicable to the end of the lens housing to hold the filter in place in front of the lens.

These filter holders have been found objectionable in that they are not capable of enabling ready substitution of filters, but require the expenditure of considerable time and effort in changing from one type of filter to another.

Various attempts have been made in the past to provide combined filter holder and sunshade attachments, but such attachments invariably consisted of two separate parts, one a filter holder and the other a sunshade, which upon assembly effected securement of a filter in place therein. To change filters, therefore, it was necessary to first disassemble the attachment.

With this objection to past types of filter and sunshade attachments in mind, it is an object of this invention to provide an improved filter holder of the character described capable of serving as a sunshade to shield the lens in the event the same is pointed at an object in line with or near a source of light.

Another object of this invention is to provide an improved filter holder by means of which substitution of filters is greatly facilitated and which does not require removal of the holder from the lens housing of the camera for such substitution.

A further object of this invention resides in the provision of a simple and efficient combined filter holder and sunshade for cameras which may be manufactured at a minimum of cost and which greatly facilitates photographic work.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates two complete examples of the physical embodiments of the invention constructed in accordance with the best modes so far devised for the practical application of the principles thereof, and in which:

Figure 1 illustrates the combined filter holder and sunshade of this invention partly in section and partly in elevation to show the manner of its attachment to a camera;

Figure 2 is an enlarged perspective view of the combined filter holder and sunshade;

Figure 3 is a cross-sectional view taken through the filter holder and illustrating the manner in which filter units are removably retained in place therein; and Figure 4 is a view similar to Figure 3 illustrating a slightly modified manner of retaining a filter unit in place in the filter holder.

Referring now particularly to the accompanying drawing, in which like numerals indicate like parts, the numeral 5 designates the bellows portion of a camera having a protruding shutter and lens assembly housing indicated generally by the numeral 6. The extremity 7 of the housing 6 is always made cylindrical and encloses the lens of the camera.

The combined sunshade and filter holder 8 of this invention comprises a tubular sunshade portion 9 having a reduced tubular attaching neck 10 at one end and integral therewith, by means of which the attachment is secured to the camera. This attaching neck is provided with a rim 11 having a multitude of serrations 12 extending longitudinal of the neck.

The rim 11 is of a size to be telescoped over the exterior of the cylindrical lens housing 7, and as will be apparent, the serrations of the rim compensate for considerable variation in the external diameter of the lens housing of different cameras and also serve to yieldingly clamp the attachment to the lens housing.

The inner wall of the tubular attaching neck is provided with spaced apart annular shoulders 13 and 14, with the shoulder or rib 13 closest to the rim 11 adapted to abut against the end of the lens housing of the camera to define the position of the attachment thereon. The space between the ribs or abutments 13 and 14 constitutes a compartment 15 for the reception of a filter unit indicated generally by the numeral 16 in Figure 1.

The filter unit preferably comprises a glass disc 17 of any of a variety of colors mounted in a ring 18 which encircles the periphery of the disc.

As clearly seen in Figure 1, the filter compartment is so formed as to hold the filter unit in a plane normal to the axis of the neck 10, in a position such that all light rays pass therethrough before reaching the lens of the camera.

A circumferential slot 19 in the side wall of the neck 10 opens into the filter compartment 15 and provides for the edgewise passage of the filter unit to and from its operative position within the compartment 15.

The slot 19 extends throughout substantially one-half the circumference of the neck 10 to facilitate movement of the filter unit therethrough.

Attention is directed to the fact that the filter unit is constrained to movement to and from its operative position in a plane normal to the axis of the neck. This feature enables interchange of filter units without necessitating the removal of the attachment from the lens housing and without requiring separation of the holder and sunshade parts of the attachment as was necessary in the past.

It is necessary, however, that means be provided to removably retain the filter assembly in its operative filtering position within its compartment and against accidental displacement with respect thereto. To this end a leaf spring 20 is provided which substantially encircles the neck 10 at the slot 19 thereof to cover the slot.

This spring has its opposite ends normally adjacent to each other and to one extremity of the slot 19. One end of the spring is secured as by rivets or screws 21 or any other suitable fastening means to the wall of the neck 10, as clearly seen in Figure 3.

The extremity 23 of the free end of the spring overlies the wall of the neck 10 as shown, and is bent upwardly to enable the finger of an operator of the camera to lift the spring out of its filter unit retaining position.

Projections or rivets 22 may be carried by the free end of the spring at its portion overlying the opening to engage the outer periphery of mounting ring 18 of the filter unit and thereby yieldingly secure the same in place in its compartment and hold the unit against rattling.

If desired, the filter retainer may be constructed as illustrated in Figure 4.

In this embodiment of the invention, the filter assembly is maintained in place in its compartment within the neck 10 by means of an arcuate strip 24 shaped to loosely fit the slot 19 to cover the entire length thereof.

This strip may be of relatively unyielding material, and is urged to an operative position in the slot 19 engaging the periphery of the rim 18 of the filter unit by means of a resilient spring metal blade 26 connecting one end of the strip with the wall of the neck. The spring blade is secured to the strip 24 and the wall of the neck 10 by means of rivets or screws 27.

The other or free end 25 of the strip is bent upwardly as at 28 out of the slot 19 to overlie the adjacent wall of the neck 10 and provides a finger-engaging portion by means of which the strip may be swung away from the opening to enable assembly or disassembly of a filter unit.

As clearly illustrated in Figure 1, the attachment of the entire unit to a camera merely entails slipping the serrated rim of the neck 10 over the exterior of the lens housing of the camera.

It will also be noted that the advantages of filtering the light rays passing into the bellows through the lens of the camera and shading of the lens is accomplished in an efficient manner by the combination filter holder and sunshade of this invention.

All of the light rays passing through the lens of the camera must necessarily first pass through the filter, and in the event it is desired to replace the filter by other types for other purposes, it is merely necessary to lift the closure for the slot 19 forming the entrance to the filter compartment for the removal of such filter and the assembly of another within the holder. Such assembly and disassembly is readily accomplished without removing the attachment from the lens housing of the camera.

From the foregoing description taken in connection with the accompanying drawing, it will be readily apparent to those skilled in the art that this invention provides a simple and efficient combination sunshade and filter holder for cameras.

What I claim as my invention is:

1. A combination sunshade and filter holder for cameras having a protruding lens housing comprising: a one piece body formed to provide a circular neck of a size to frictionally engage the protruding lens housing of the camera and an enlarged skirt extending forwardly from the neck to provide a sunshade; axially spaced shoulders on the inner surface of the neck defining therebetween a filter compartment adapted to hold a filter unit crosswise of the neck; said neck having an entrance slot through its side wall communicating with the filter compartment and extending for substantially one-half its circumference to enable edgewise insertion and removal of a filter to and from an operative position within the filter compartment; a closure for said slot shaped to conform to the neck and adapted to cover the entire slot; and common spring means permanently anchoring said closure to the neck and biasing the same to its closed position covering the entrance slot.

2. A combination sunshade and filter holder attachment for cameras having a protruding lens housing comprising: a substantially circular neck portion; an outwardly flared and forwardly extended skirt projecting from the neck; an expansible rim on the neck adapted to frictionally engage over the lens housing of the camera to secure the attachment in place thereon; shoulders on the inside of the circular neck defining an annular groove to receive a filter unit and hold the same crosswise of the neck; said neck having an arcuate entrance slot in its side wall communicating with said annular groove and extending substantially for one-half the circumference thereof to enable edgewise insertion and removal of a filter unit to and from an operative position in said groove; a circular band of ribbon-like spring stock encircling the neck with one end portion thereof covering and closing the entrance slot; and means permanently securing the opposite end of the band of spring stock to the neck whereby said first designated end portion is biased to its closed position while being springable to uncover the entrance slot.

ROBERT W. LOEBE.